(12) United States Patent
Huang

(10) Patent No.: US 8,228,467 B2
(45) Date of Patent: Jul. 24, 2012

(54) REFLECTIVE COLOR FILTER LIQUID CRYSTAL DISPLAY

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 94 days.

(21) Appl. No.: 12/830,623

(22) Filed: Jul. 6, 2010

(65) Prior Publication Data

US 2011/0007249 A1   Jan. 13, 2011

Related U.S. Application Data

(60) Provisional application No. 61/223,556, filed on Jul. 7, 2009.

(51) Int. Cl.
*G02F 1/1343* (2006.01)
(52) U.S. Cl. .......... 349/113; 349/106; 349/162
(58) Field of Classification Search .......... None
See application file for complete search history.

(56) References Cited

U.S. PATENT DOCUMENTS

| | | | |
|---|---|---|---|
| 4,654,117 A | 3/1987 | Aoki et al. | |
| 5,705,302 A * | 1/1998 | Ohno et al. | 430/7 |
| 5,742,373 A * | 4/1998 | Alvelda | 349/201 |
| 5,936,693 A | 8/1999 | Yoshida et al. | |
| 6,104,459 A * | 8/2000 | Oike et al. | 349/105 |
| 6,181,397 B1 * | 1/2001 | Ichimura | 349/113 |
| 6,552,765 B2 * | 4/2003 | Kurata | 349/113 |
| 6,654,086 B2 * | 11/2003 | Nakasima | 349/113 |
| 6,872,586 B2 * | 3/2005 | Kiguchi et al. | 438/28 |
| 7,433,003 B2 * | 10/2008 | Liao | 349/106 |
| 7,477,344 B2 | 1/2009 | Liu et al. | |
| 7,675,593 B2 * | 3/2010 | Kim et al. | 349/114 |
| 2005/0099559 A1 * | 5/2005 | Lee et al. | 349/113 |
| 2008/0106677 A1 * | 5/2008 | Kuan et al. | 349/108 |
| 2009/0128768 A1 * | 5/2009 | Kar-Roy | 349/155 |
| 2010/0328590 A1 * | 12/2010 | Huang | 349/113 |

FOREIGN PATENT DOCUMENTS

| | | |
|---|---|---|
| JP | 64-35590 | 2/1989 |
| JP | 8-313726 A * | 11/1996 |
| JP | 10-301129 A * | 11/1998 |
| TW | 564327 | 12/2003 |

* cited by examiner

*Primary Examiner* — Mike Stahl
(74) *Attorney, Agent, or Firm* — J.C. Patents

(57) ABSTRACT

A reflective color filter liquid crystal display, in the reverse order of receiving incident light, includes a backplane substrate, a reflective electrode layer, a planar liquid crystal cell, a transparent protective dielectric layer and a transparent plate. The transparent plate is adapted for receiving and transmitting the incident light. The planar liquid crystal cell is sandwiched between the reflective electrode layer and the transparent conductive film. The reflective electrode layer further includes a first band reflective electrode, a second band reflective electrode and a third band reflective electrode in a regularly tiled planar arrangement.

12 Claims, 2 Drawing Sheets

REFLECTIVE COLOR FILTER LIQUID CRYSTAL DISPLAY

CROSS-REFERENCE TO RELATED APPLICATIONS

This application claims priority of U.S. provisional application No. 61/223,556, filed on Jul. 7, 2009, entitled "Reflective Color Filter Liquid Crystal Display", which is incorporated herein by reference in its entirety.

FIELD OF THE TECHNOLOGY

The present invention generally relates to a spatial modulation display panel, and more particularly to a reflective color filter liquid crystal display.

BACKGROUND

In recent years, flat panel displays and liquid crystal displays (LCD) in particular, enabled by the optoelectronic technology and the integrated circuits technology, have become a mainstream of display devices. An LCD display has several advantageous features including thin-flat shape, lightweight, low operating voltage, low power-consumption, full colorization and low radiation, among others. The LCD display panels are classified into a transmission type, a reflective type and a transflective type according to their light-emitting mechanisms, wherein the reflective LCD displays include liquid crystal projectors and reflective liquid crystal on silicon (LCOS).

The basic planar components of an LCD panel include a top cover glass with a transparent protective dielectric layer, a liquid crystal planar cell, a pixelated-electrode matrix backplane (transparent or reflective), at least one polarization film and a color filer array film. Colorization is always one of the critical technical components to LCD and all of its subsidiary classes. The most commonly used colorization scheme is based on a pixelated color filter array film placed, made of polymeric materials containing color pigments and/or dye, which requires accurately alignment with the pixelated-electrode matrix backplane. Aligning and placing such pixelated color filter array film directly on the reflective electrodes introduces optical and electrical issues including inter-pixel color blur, degradation of optical efficiency and electrical field drop from thick dielectric color filters, among others.

SUMMARY

The present invention is related to a reflective color filter LCD in order to decrease complexity of LCD and improve optical efficiency.

One aspect of the present invention provides a reflective color filter LCD. In a reverse order of receiving an incident light along an incident direction, the reflective color filter LCD includes a backplane substrate, a reflective electrode layer, a planar liquid crystal cell, a transparent conductive film and a transparent plate.

The transparent plate is adapted for receiving and transmitting the incident light.

The planar liquid crystal cell is sandwiched between the reflective electrode layer and the transparent conductive film.

The reflective electrode layer includes a first band reflective electrode, a second band reflective electrode and a third band reflective electrode placed on top of the backplane substrate in a regularly tiled planar arrangement perpendicular to the incident direction, and are electrically isolated from each other, adapted for reflecting the incident light passing through the transparent plate to form a first reflective light corresponding to a first reflection spectrum, a second reflective light corresponding to a second reflection spectrum and a reflective light corresponding to a third reflection spectrum, respectively.

The backplane substrate includes a driving circuitry electrically connected to the first band reflective electrode, the second band reflective electrode and the third band reflective electrode, adapted for forming electric field between the reflective electrode layer and the transparent conductive film, driving liquid crystal molecules in the planar liquid crystal cell to twist so as to allow the incident light to reach the reflective electrode layer and allow the first reflective light, the second reflective light and the third reflective light to irradiate out of the transparent substrate.

In the present invention, the reflective colored liquid crystal spatial modulation display uses three band reflective electrodes in the reflective electrode layer 210 to perform spatially modulation by reflecting lights so as to realize colorization; therefore, there is no need to use the existing color filter array film and the requirement that the color filters shall accurately align with pixilated-electrodes in the pixilated-electrode matrix backplane does not exist accordingly, which decreases complexity of LCD and improves optical efficiency.

BRIEF DESCRIPTION OF THE DRAWINGS

The disclosure may be more completely understood in consideration of the following detailed description of various embodiments in connection with the accompanying drawings, in which.

DETAILED DESCRIPTION

The drawings for illustration are not necessarily to scale, emphasis instead being placed upon illustrating the framework and principles of the present invention. In the following description, reference is made to the accompanying drawings which form a part hereof, and which show, by way of illustration, a preferred embodiment of the present invention. It is understood that other embodiments may be utilized and structural changes may be made without departing from the scope of the present invention.

Figure 1:
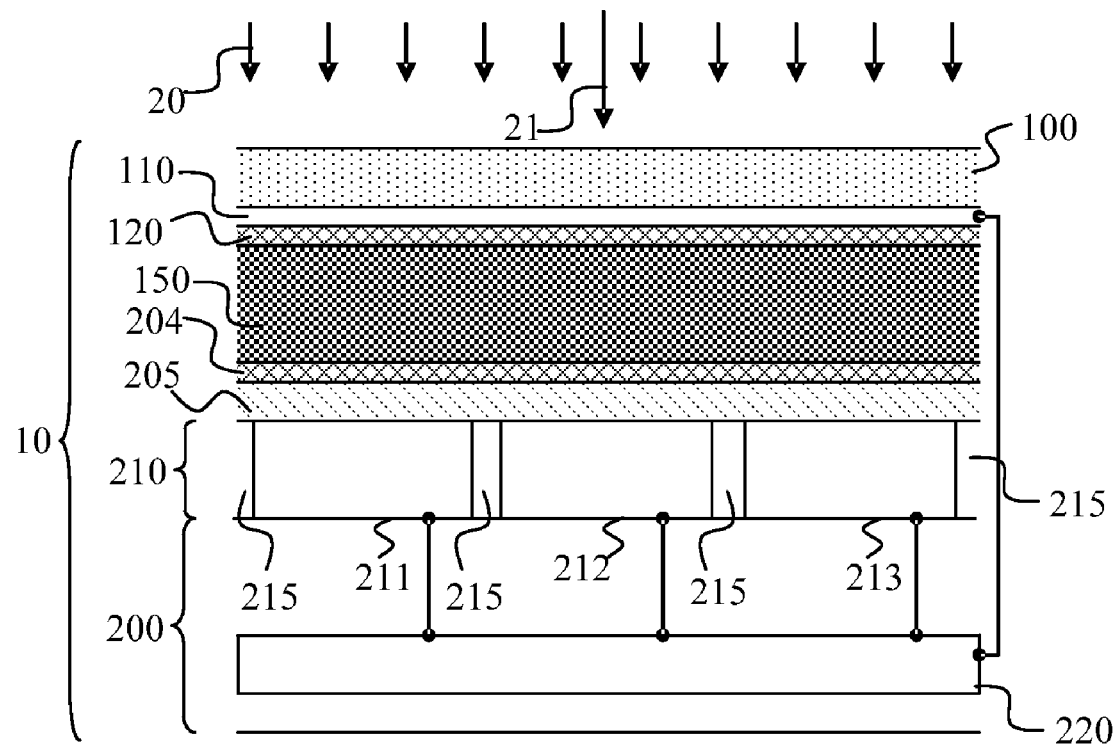
FIG. 1 is a cross sectional view of the reflective color filter LCD according to an embodiment of the present invention.

FIG. 1 is a cross sectional view of the reflective color filter LCD 10 according to an embodiment of the present invention. In the reverse order of receiving incident light 20 along the incident direction 21, the reflective color filter LCD 10 includes a backplane substrate 200, a reflective electrode layer 210, a planar liquid crystal cell 150, a transparent conductive film 110 and a transparent plate 100.

Herein the transparent plate 100 receives and transmits the incident light 20, and the reflective electrode layer 210 includes a first band reflective electrode 211, a second band reflective electrode 212 and a third band reflective electrode 213 placed on top of the backplane substrate 200 in a regularly tiled planar arrangement perpendicular to the incident direction 21, and are electrically isolated from each other. Specifically, the first band reflective electrode 211, the second band reflective electrode 212 and the third band reflective electrode 213 may be electrically isolated by pixel isolators 215 from each other.

Serving the color filtering function, the first band reflective electrode 211, the second band reflective electrode 212 and the third band reflective electrode 213 reflect the incident light 20 passing through the transparent plate 100 and form a first reflective light corresponding to a first reflection spectrum, a second reflective light corresponding to a second reflection spectrum and a reflective light corresponding to a third reflection spectrum, respectively. As widely used in many display or imaging systems, the first reflection spectrum, the second reflection spectrum and the third reflection spectrum correspond to band pass spectra of blue, green and red respectively, so as to realize colorization based on red, green and blue (RGB) color mode; alternatively, the first reflection spectrum, the second reflection spectrum and the third reflection spectrum correspond to band block spectra of yellow, magenta and cyan respectively so as to realize colorization based on or cyan, yellow and magenta (CYM) color mode.

The planar liquid crystal cell 150 is sandwiched between the reflective electrode layer 210 and the transparent conductive film 110. The backplane substrate 200 includes a driving circuitry 220 electrically connected to the first band reflective electrode 211, the second band reflective electrode 212 and the third band reflective electrode 213. The driving circuitry 220 can form electric field between the reflective electrode layer 210 and the transparent conductive film 110 for driving liquid crystal molecules in the planar liquid crystal cell 150 to twist so as to allow the incident light 20 to reach the reflective electrode layer 210 and allow the first reflective light, the second reflective light and the third reflective light to irradiate out of the transparent substrate 100.

Figure 2:
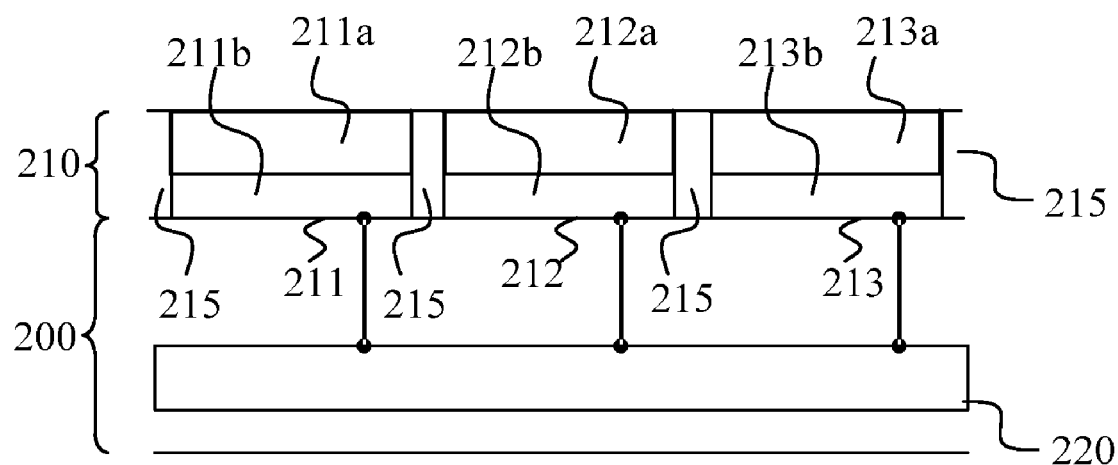
FIG. 2 is a cross sectional view of an alternative structure of the reflective electrode layer shown in FIG. 1.

FIG. 2 is a cross sectional view of an alternative structure of the reflective electrode layer 210 shown in FIG. 1. Herein, the reflective electrode layer 210 consists of an array of the first band reflective electrode 211, the second band reflective electrode 212 and the third band reflective electrode 213 in a stacked film configuration. Specifically, the first band reflective electrode 211 includes a first reflective electrode plate 211b stacked and electrically connected with a first conductive color filtering element 211a, the second band reflective electrode 212 includes a second reflective electrode plate 212b stacked and electrically connected with a second conductive color filtering element 212a, and the third band reflective electrode 213 includes a third reflective electrode plate 213b stacked and electrically connected with a third conductive color filtering element 213a. The first conductive color filtering element 211a, the second conductive color filtering element 212a and the third conductive color filtering element 213a may be made from conductive inks or conductive paints which contain color conductive particles. The first reflective electrode plate 211b, the second reflective electrode plate 212b and the third reflective electrode plate 213b made of any or combination of reflective metals and their alloys includes aluminum, titanium, copper, platinum, silver and gold. The color conductive particles may be any or combination of powdered silver and carbon with color additives such as pigments or dye.

Based on the configuration shown in FIG. 2, the driving circuitry 220 may further electrically charge or discharge the first conductive color filtering element 211a via the first reflective electrode plate 211b for driving the color conductive particles in the first conductive color filtering element 211a to move so as to modulate the light reflected from the first reflective electrode plate 211b as the first reflective light; electrically charging or discharging the second conductive color filtering element 212a via the second reflective electrode plate 212b, and driving the color conductive particles in the second conductive color filtering element 212a to move so as to modulate the light reflected from the second reflective electrode plate 212b as the second reflective light; and electrically charging or discharging the third conductive color filtering element 213a via the third reflective electrode plate 213b, and driving the color conductive particles in the third conductive color filtering element 213a to move so as to modulate the light reflected from the third reflective electrode plate 213b as the third reflective light.

Specifically, the transparent conductive film 110 may be made from Indium Tin Oxide (ITO), the driving circuitry 220 may be built into the backplane substrate 200 made from semiconductors including silicon, germanium, gallium and arsenic or from any or combination of dielectric materials including glass and polymers. The driving circuitry 220 may be formed by CMOS devices.

In addition, also as shown in FIG. 1, a first alignment layer 204 is further coated above the reflective electrode layer 210, a second alignment layer 120 is further coated underneath the transparent plate 100, and the first alignment layer 204 and the second alignment layer 120 sandwich and statically align the planar liquid crystal cell 150, for setting the initial alignment direction of the liquid crystal molecules in the planar liquid crystal cell 150. Alternatively, the first alignment layer 204 and the second alignment layer 120 may be made in any single or composite layer of polyimide, silicon oxide, silicon nitride and carbon.

For preventing ionic species contained in the reflective electrode layer 210 from diffusing into the planar liquid crystal cell 150 and protecting the reflective electrode layer 210 itself from potential damage due to fabrication of the first alignment layer 204 and so on, a transparent protective dielectric layer 205 may be further placed between the reflective electrode layer 210 and first alignment layer 204. Such transparent protective dielectric layer 205 may be made from any or combination of polyimide, silicon oxide, silicon nitride and carbon, commonly available in typical silicon semiconductor manufacturing process.

In the present embodiment, the reflective colored liquid crystal spatial modulation display uses three band reflective electrodes in the reflective electrode layer 210 to perform spatially modulation by reflecting lights so as to realize colorization; therefore, there is no need to use the existing color filter array film and the requirement that the color filters shall accurately align with pixilated-electrodes in the pixilated-electrode matrix backplane does not exist accordingly, which decreases complexity of LCD and improves optical efficiency.

Besides, the reflective electrode layer 210 serves not only as the bottom electrode mirroring the transparent conductive film 110 at top for forming electrical field cross the planar liquid crystal cell 150 sandwiched between thereof, but also as the optical reflector of light of a band in visible spectrum to the incident light 20 as well; therefore, such self-aligned and assembled color pixel architecture systematically simplifies the electro-optical structure for a colored LCD.

Figure 3:
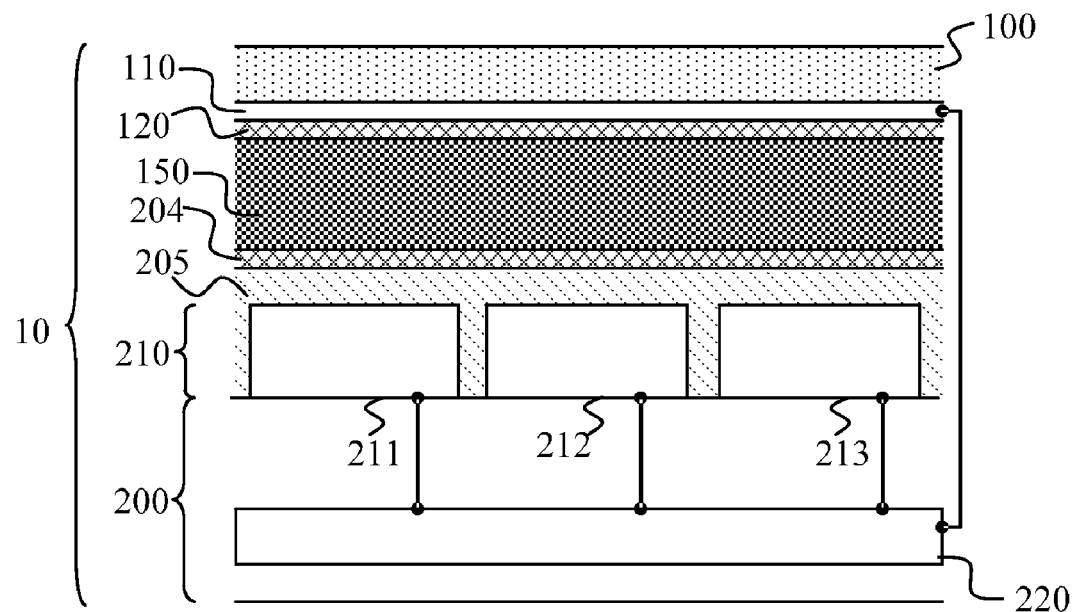
FIG. 3 is a cross sectional view of the reflective color filter LCD according to another embodiment of the present invention.

FIG. 3 is a cross sectional view of the reflective color filter LCD 10 according to another embodiment of the present invention. Herein, the transparent protective dielectric layer 205 is further filled in the gaps among the first band reflective electrode 211, the second band reflective electrode 212 and the third band reflective electrode 213, and is adapted for electrically isolating the first band reflective electrode 211, the second band reflective electrode 212 and the third band reflective electrode 213 from each other. In the structure shown in FIG. 3, the transparent protective dielectric layer 205 serves functions of both protection and isolation so that there is no need to include the pixel isolators 215, which further simplifies the microstructure of such reflective color filter LCD 10 and its fabrication process.

Figure 4:
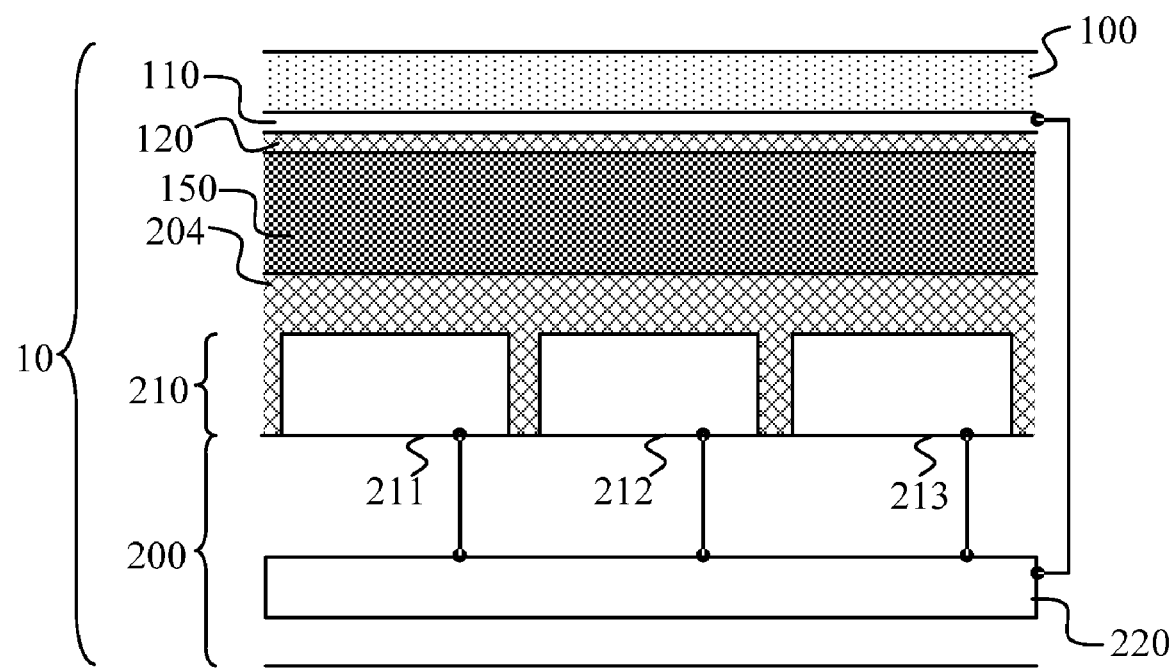
FIG. 4 is a cross sectional view of the reflective color filter LCD according to another embodiment of the present invention.

FIG. 4 is a cross sectional view of the reflective color filter LCD 10 according to another embodiment of the present invention. Herein the first alignment layer 204 is further filled in the gaps among the first band reflective electrode 211, the second band reflective electrode 212 and the third band reflective electrode 213, and is adapted for electrically isolating the first band reflective electrode 211, the second band reflective electrode 212 and the third band reflective electrode 213 from each other. In the structure shown in FIG. 4, the first alignment layer 204 serves functions of both initial alignment and isolation so that there is no need to include the pixel isolators 215, which further simplifies the microstructure of such reflective color filter LCD 10 and its fabrication process.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A reflective color filter LCD, in a reverse order of receiving an incident light along an incident direction, comprising: a backplane substrate, a reflective electrode layer, a planar liquid crystal cell, a transparent conductive film and a transparent plate, wherein:
   the transparent plate is adapted for receiving and transmitting the incident light;
   the planar liquid crystal cell is sandwiched between the reflective electrode layer and the transparent conductive film;
   the reflective electrode layer comprises a first band reflective electrode, a second band reflective electrode and a third band reflective electrode placed on top of the backplane substrate in a regularly tiled planar arrangement perpendicular to the incident direction, and are electrically isolated from each other by a first alignment layer, adapted for reflecting the incident light passing through the transparent plate to form a first reflective light corresponding to a first reflection spectrum, a second reflective light corresponding to a second reflection spectrum and a third reflective light corresponding to a third reflection spectrum, respectively;
   the backplane substrate comprises a driving circuitry electrically connected to the first band reflective electrode, the second band reflective electrode and the third band reflective electrode, adapted for forming electric field between the reflective electrode layer and the transparent conductive film, driving liquid crystal molecules in the planar liquid crystal cell to twist so as to allow the incident light to reach the reflective electrode layer and allow the first reflective light, the second reflective light and the third reflective light to irradiate out of the transparent substrate,
   wherein the first alignment layer is coated above the reflective electrode layer, and further filled in gaps among the first band reflective electrode, the second band reflective electrode and the third band reflective electrode to electrically isolate the first band reflective electrode, the second band reflective electrode and the third band reflective electrode from each other.

2. The LCD according to claim 1, wherein the first band reflective electrode comprises a first reflective electrode plate b stacked and electrically connected with a first conductive color filtering element a, the second band reflective electrode comprises a second reflective electrode plate b stacked and electrically connected with a second conductive color filtering element a, and the third band reflective electrode comprises a third reflective electrode plate b stacked and electrically connected with a third conductive color filtering element a.

3. The LCD according to claim 2, wherein:
   the first conductive color filtering element a, the second conductive color filtering element a and the third conductive color filtering element a are made from conductive inks or conductive paints which contain color conductive particles; and
   the first reflective electrode plate b, the second reflective electrode plate b and the third reflective electrode plate b are made of at least one reflective metal and/or an alloy thereof, said metal selected from the group consisting of aluminum, titanium, copper, platinum, silver and gold.

4. The LCD according to claim 3, wherein the driving circuitry is further adapted for:
   electrically charging or discharging the first conductive color filtering element a via the first reflective electrode plate b, and driving the color conductive particles in the first conductive color filtering element a to move so as to modulate the light reflected from the first reflective electrode plate b as the first reflective light;
   electrically charging or discharging the second conductive color filtering element a via the second reflective electrode plate b, and driving the color conductive particles in the second conductive color filtering element a to move so as to modulate the light reflected from the second reflective electrode plate b as the second reflective light; and
   electrically charging or discharging the third conductive color filtering element a via the third reflective electrode plate b, and driving the color conductive particles in the third conductive color filtering element a to move so as to modulate the light reflected from the third reflective electrode plate b as the third reflective light.

5. The LCD according to claim 3, wherein the color conductive particles are any or combination of powdered silver and carbon with color additives.

6. The LCD according to claim 1, wherein the first reflection spectrum, the second reflection spectrum and the third reflection spectrum correspond to band pass spectra of blue, green and red, respectively.

7. The LCD according to claim 1, wherein the first reflection spectrum, the second reflection spectrum and the third reflection spectrum correspond to band block spectra of yellow, magenta and cyan, respectively.

8. The LCD according to claim 1, wherein the reflective color filter LCD further comprises a second alignment layer which is further coated underneath the transparent plate, and the first alignment layer and the second alignment layer sandwich the planar liquid crystal cell.

9. The LCD according to claim 8, wherein the first alignment layer and the second alignment layer are made in any single or composite layer of polyimide, silicon oxide, silicon nitride and carbon.

10. The LCD according to claim 1, wherein the backplane substrate is made from semiconductors comprising silicon, germanium, gallium and arsenic.

11. The LCD according to claim 1, wherein the backplane substrate is made from any or combination of dielectric materials comprising glass and polymers.

12. The LCD according to claim 1, wherein the driving circuitry is formed by CMOS devices.

* * * * *